United States Patent Office 3,148,521
Patented Sept. 15, 1964

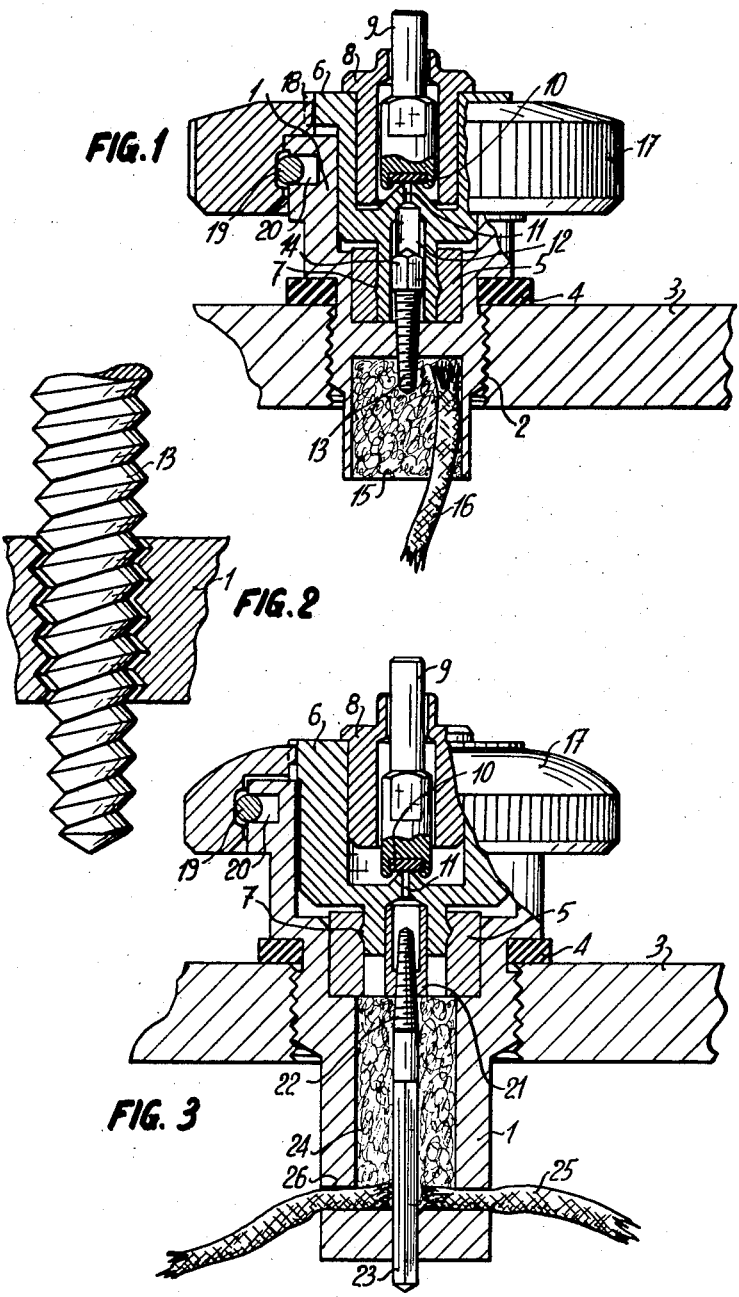

3,148,521
BURNER FOR LIQUEFIED GAS LIGHTERS
Conrad Zellweger, Chene-Bougeries, Geneva, Switzerland, assignor to La Nationale S.A., Geneva, Switzerland, a corporation of Switzerland
Filed June 27, 1962, Ser. No. 206,141
Claims priority, application Switzerland, July 4, 1961, 7,816/61
6 Claims. (Cl. 67—7.1)

Many burners for liquefied gas lighters are provided with a device for controlling the gas flow. In certain known constructions, this control device comprises a passage of adjustable section. In one known construction an aperture is closed to a varying degree by means of a pointed screw, but in view of the very small dimensions of the passage which has to be left free to give a flame of suitable height for a lighter, this construction does not give good results, since it requires excessive precision in the construction of the screw-threads, and despite all the care devoted to the latter this construction does not enable stable adjustment of the flame height to be achieved.

The object of the present invention is to provide a burner for a liquefied gas lighter having a gas flow control device comprising a passage of variable section, which is of very simple construction and ensures high stability of the flame height. This burner is characterised in that the adjustable section passage is formed by a space contained between the screw-threads of two screw-threaded parts fitted one inside the other, at least one of the said screw-threaded parts being of conical shape.

The accompanying drawing diagrammatically illustrates by way of example two embodiments of the burner according to the invention.

FIGURE 1 is an axial section of the first embodiment.

FIGURE 2 is an enlarged view of a detail of this embodiment.

FIGURE 3 is an axial section of the second embodiment.

The burner shown in FIGURE 1 comprises a body 1 having an external screw thread 2 enabling said body to be screwed to a wall 3 of a gas lighter. A gasket 4 ensures a gas-tight seal between the body 1 and the wall 3. The body 1 has a top recess in which is fitted a sleeve 5 of deformable synthetic resin, and a central part 6, the bottom end of which is fitted in the sleeve 5, this end having an annular rib 7 intended to deform the sleeve 5 and compress it so as to ensure a gas-tight seal between the part 6 and the body 1.

The part 6 has an opening at its top part which is closed by a bell 8 containing a closure piston 9. At its bottom part, the latter has a lining 10 of flexible material which is intended to bear against the edge of an aperture 11 for the passage of the gas.

The bottom part of the element 6 has an axial bore 12, the walls of which have four longitudinal grooves intended to drive a screw 13, the head 14 of which is of square section, so that its edges are engaged in the grooves. The screw threaded part of the screw 13 is conical, the angle included between a generatrix of the cone of this screw and the axis of the latter being about 2°. This screw 13 is fixed in a screw-threaded bore formed in a transverse wall in the body 1 which latter also has a recess beneath the wall, the recess being filled by an absorbent material 15, such as cotton, which is constantly impregnated with gas in the liquid state supplied by means of a wick 16.

The screw-threaded bore and the part of the conical screw 13 engaged therein are shown on a larger scale in FIGURE 2, the screw-threaded bore naturally being machined so that its screw-thread corresponds exactly to that of the screw 13. However, it is more advantageous to make the body 1 of a relatively soft material, for example a zinc-containing alloy, which is conventionally used for die-cast components, to drill a smooth bore in the body 1, and then to fix the screw 13, which may be of steel, in the bore. On introduction of the screw into the bore, the relatively soft metal of the body 1 is deformed by the screw 13 so as to form a screw thread corresponding exactly to that of the screw.

Control of the gas flow is effected very simply by turning the part 6 inside the body 1 so as to screw the screw 13 into its bore to a varying degree. As a result of the small conicity of the screw on the one hand and the helical shape of the passage provided for the gas, on the other hand, the flow of the latter is very regular and may be controlled with high precision. Rotation of the part 6 is effected simply by means of a knob 17 provided with grooves which engage with corresponding grooves 18 of the part 6. This knob 17 is kept in place by means of a resilient retaining ring 19 fitted in a groove 20 in the body 1.

FIGURE 3 shows a variant of great similarity to the embodiment according to FIGURE 1, but wherein the position of the conical screw is the opposite to that shown in FIGURE 1. In this variant, parts similar to those shown in FIGURE 1 have been given the same reference numerals.

It will be seen that the botom part of the element 6 is slightly modified and contains a cylindrical recess into which a deformable synthetic resin sleeve 21 is forced. A conical screw 22 is screwed into the end of this sleeve and has a relatively long head 23 of square section which is engaged in a square hole formed at the base of the body 1. In co-operation with the sleeve 5 and the part 6, the body encloses a chamber 24 filled with cotton which is continuously impregnated with liquid gas by means of a wick 25 passing through a transverse bore 26 formed in the body.

In this embodiment as in that described hereinbefore, a rotation of the part 6 causes the conical screw to be screwed into its bore, this screwing movement being accompanied by longitudinal displacement of the screw which is possible by the sliding of its square section head in the corresponding hole.

Numerous modifications may naturally be made to the construction of the burner described, and in particular the form of the screw thread of the screw 13 could be modified. The latter could, for example, have a screw thread with straight flanks and the conicity of the screw may also be different from that shown. However, it is advantageous to provide a relatively small conicity, for example of which the angle at the apex is less than 10°, to obtain fine and precise control of the flame height.

It is naturally also possible to reverse the method of fixing the conical screw and its bore, in which case the screw may be fixed rigidly either on the body 1 or on the part 6, while the bore would be formed by a sleeve adapted to slide axially either in the part 6 or in the body 1. Moreover, it is obviously possible to form the bore in a bush of hard material, the screw then being formed of a softer material so that the screw thread of the latter may be made simply by forcing said softer material into the screw thread bore.

I claim:

1. A burner valve assembly for use in connection with a gas lighter said assembly comprising: a body member, a control knob member mounted for rotation in a fixed plane on said body member, an internally screwthreaded part having a bore extending therethrough, an externally screwthreaded part, the screwthreads of at least one of said parts being tapered, the screwthreads of said parts further being in mutual engagement thereby to define a helical gas passage having cross sectional dimensions which vary as said parts are rotated relative to each other, means preventing relative rotation between a first of said parts and said knob member, means preventing relative rotation between the other of said parts and said body member, at least one of said means further being arranged to permit relative longitudinal movement between the part and the member whose relative rotation it prohibits, and means for directing the flow of gas into and out of said helical gas passage.

2. A burner valve assembly for use in connection with a gas lighter, said assembly comprising: a body member, a control knob member mounted for rotation in a fixed plane on said body member, said members being provided with a continuous opening common to both members and which extends axially of said knob member, said members further being mutually sealed in a manner permitting relative rotation without fluid leakage therebetween, an internally screwthreaded part extending across said opening, and having an axial opening therethrough, an externally screwthreaded part, the screwthreads of at least one of said parts being tapered, the screwthreads of said parts further being in mutual engagement thereby to define a helical gas passage having cross sectional dimensions which vary as said parts are rotated relative to each other, means preventing relative rotation between a first of said parts and said knob member, means preventing relative rotation between the other of said parts and said body member, at least one of said means further being arranged to permit relative longitudinal movement between the part and the member whose relative rotation it prohibits.

3. A burner valve assembly for use in connection with a gas lighter, said assembly comprising: a body member, a control knob member mounted for rotation in a fixed plane on said body member, said members being provided with a common continuous opening which extends axially of said knob member, said members further being mutually sealed in a manner permitting relative rotation without fluid leakage therebetween, an internally screwthreaded part having an axial opening extending therethrough, said internally screwthreaded part extending fully arcoss said continuous opening and sealed about its periphery to one of said members, an externally screwthreaded part formed to fit within said continuous opening and to engage the other of said members in a longitudinal groove and corner arrangement which prevents relative rotation therebetween while permitting relative longitudinal movement and longitudinal gas passage therebetween, the screwthreads of at least one of said parts being tapered, such screwthreads further being in mutual engagement thereby to define a helical gas passage having cross sectional dimensions which vary as said parts are rotated relative to each other.

4. A burner valve assembly for use in connection with a gas lighter, said assembly comprising: a body member, a control knob member mounted for rotation in a fixed plane on said body member, said members being provided with a common continuous opening which extends axially of said knob member, said members further being mutually sealed in a manner permitting relative rotation without fluid leakage therebetween, an internally screwthreaded part having a bore extending therethrough, an externally screwthreaded part, the screwthreads of both of said parts being tapered and formed in precise conformity with each other, whereby there is defined by the adjacent surfaces of said screwthreads a helical gas passage having throughout a continuous cross section which varies as one of said parts is rotated relative to the other, means preventing relative rotation between one of said parts and said knob member, means preventing relative rotation between the other of said parts and said body member, at least one of said means further being arranged to permit relative longitudinal movement between the part and the member whose relative rotation it prohibits, and means for directing the flow of gas into and out of said helical gas passage.

5. A burner valve assembly for use in connection with a gas lighter, said assembly comprising: a body member, a control knob member mounted for rotation in a fixed plane on said body member, an internally screwthreaded part having a bore extending therethrough, an externally screwthreaded part, one of said screwthreaded parts being of a softer and more yieldable material than the other screwthreaded part and having its screwthreads formed in precise conformity with the screwthreads of the other part by the turning and tightening of said parts relative to each other, the screwthreads of said parts being tapered to define therebetween a helical gas passage having throughout a continuous cross section which varies as one of said parts is rotated relative to the other, means preventing relative rotation between one of said parts and said knob member, means preventing relative rotation between the other of said parts and said body member, at least one of said means further being arranged to permit relative longitudinal movement between the part and the member whose relative rotation it prohibits, and means for directing the flow of gas into and out of said helical gas passage.

6. A burner valve assembly for use in connection with a gas lighter, said assembly comprising: a body member, a control knob member mounted for rotation in a fixed plane on said body member, said members being provided with a common continuous opening which extends axially of said knob member, said members further being mutually sealed in a manner permitting relative rotation without fluid leakage therebetween, an internally screwthreaded part having a bore extending therethrough, an externally screwthreaded part, the screwthreads of both of said parts being tapered and formed in precise conformity with each other, whereby there is defined by the adjacent surfaces of said screwthreads a helical gas passage having throughout a continuous cross section which varies as one of said parts is rotated relative to the other, means preventing relative rotation between one of said parts and said knob member, means preventing relative rotation between the other of said parts and said body member, at least one of said means further being arranged to permit relative longitudinal movement between the part and the member whose relative rotation it prohibits, means for directing the flow of gas into and out of said helical gas passage, said body member extending down around said parts and defining under said parts a recess into which said externally screwthreaded part extends, said recess being filled with an absorbent material which is held thereby in intimate contact with the screwthreads of said externally screwthreaded part, and a wick element leading into said absorbent material for supplying gas in the liquid state.

References Cited in the file of this patent

UNITED STATES PATENTS

| | | |
|---|---|---|
| 2,677,948 | Gehrie | May 11, 1954 |
| 2,737,795 | Gruber | Mar. 13, 1956 |
| 2,747,394 | Nissen | May 29, 1956 |
| 2,836,044 | Zellweger | May 27, 1958 |
| 3,091,213 | Maskell et al. | May 28, 1963 |

FOREIGN PATENTS

| | | |
|---|---|---|
| 1,087,312 | France | Aug. 25, 1954 |